United States Patent
Hughes

(10) Patent No.: US 9,092,701 B2
(45) Date of Patent: *Jul. 28, 2015

(54) METHODS AND SYSTEMS FOR ACQUIRING SPECIFICATIONS FOR REMOTELY CONTROLLING ELECTRONICS

(71) Applicant: Google Inc., Mountain View, CA (US)

(72) Inventor: Ronald Hughes, Santa Cruz, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/151,695

(22) Filed: Jan. 9, 2014

(65) Prior Publication Data

US 2014/0132773 A1     May 15, 2014

Related U.S. Application Data

(63) Continuation of application No. 12/940,842, filed on Nov. 5, 2010, now Pat. No. 8,633,986.

(51) Int. Cl.
*G06K 9/78*     (2006.01)
*H04N 21/258*     (2011.01)
*H04N 21/422*     (2011.01)
*H04N 21/4223*     (2011.01)

(52) U.S. Cl.
CPC ............ *G06K 9/78* (2013.01); *H04N 21/25825* (2013.01); *H04N 21/25833* (2013.01); *H04N 21/4223* (2013.01); *H04N 21/42225* (2013.01)

(58) Field of Classification Search
CPC ........................................................ G06K 9/78
USPC ........................................................ 348/161
See application file for complete search history.

(56) References Cited

U.S. PATENT DOCUMENTS 4,855,730 A     8/1989     Venners et al.
(Continued)

OTHER PUBLICATIONS

Jacobowitz, Logitech Harmony 300 Review & Rating, PCMAG.com, Jun. 25, 2010, 4 pgs.
(Continued)

*Primary Examiner* — Christopher S Kelley
*Assistant Examiner* — Jonathan Messmore
(74) *Attorney, Agent, or Firm* — Morgan, Lewis & Bockius LLP

(57) ABSTRACT

A computer-implemented method of controlling electronics is performed at an apparatus that includes one or more processors, a camera, and a transmitter. In the method, the camera acquires a first image of one or more electronic devices configured for remote control. A database is queried for information regarding the one or more electronic devices, based on the first image. In response to querying the database, the information regarding the one or more electronic devices is received. This information includes specifications for communicating with the one or more electronic devices. User input is received corresponding to a command for a respective electronic device of the one or more electronic devices. In response to the user input, an instruction corresponding to the command is transmitted to the respective electronic device via a signal generated by the transmitter in accordance with the specifications for communicating with the respective electronic device.

21 Claims, 12 Drawing Sheets

(56) References Cited

U.S. PATENT DOCUMENTS

| | | |
|---|---|---|
| 6,741,684 B2 | 5/2004 | Kaars |
| 2002/0180579 A1 | 12/2002 | Nagaoka et al. |
| 2007/0192910 A1 | 8/2007 | Vu et al. |
| 2008/0062034 A1 | 3/2008 | Harris et al. |
| 2008/0227384 A1 | 9/2008 | Placzek et al. |
| 2011/0114716 A1 | 5/2011 | Pratt |

OTHER PUBLICATIONS

Logitech, Logitech Harmony. The one remote that brings it all together, www.logitech.com, Jul. 19, 2010, 3 pgs.

Logitech, Universal Remotes, www.logitech.com, Oct. 17, 2007, 7 pgs.

Raphael, A Hands-On Tour: Google Goggles Visual Search, PC World, Dec. 7, 2009, 6 pgs.

Remote Shoppe Reviews Logitech Harmony One Advanced Universal Remote, Jun. 5, 2008, 7 pgs.

Device Physical Specifications Table 200

| | 204 | 206 | 208 | 210 | 212 | 214 | 216 | |
|---|---|---|---|---|---|---|---|---|
| 202 | Manufacturer | Model | Dimensions | Logo | Logo Location | LED Location | LED Color | ... |
| 202 | Manufacturer | Model | Dimensions | Logo | Logo Location | LED Location | LED Color | ... |
| 202 | Manufacturer | Model | Dimensions | Logo | Logo Location | LED Location | LED Color | ... |
| 202 | Manufacturer | Model | Dimensions | Logo | Logo Location | LED Location | LED Color | ... |

Figure 2A

Device Image Table 230

| | 234 | 236 | 238 |
|---|---|---|---|
| 232 | Manufacturer | Model | Image |
| 232 | Manufacturer | Model | Image |
| 232 | Manufacturer | Model | Image |
| 232 | Manufacturer | Model | Image |

Figure 2B

Instruction Signal Specifications
Table 260

| | 264 | 266 | 268 | 270 |
|---|---|---|---|---|
| 262 | Manufacturer | Model | Instruction | Signal Specification |
| 262 | Manufacturer | Model | Instruction | Signal Specification |
| 262 | Manufacturer | Model | Instruction | Signal Specification |
| 262 | Manufacturer | Model | Instruction | Signal Specification |

Figure 2C

LED State Specification
Table 280

| | 284 | 286 | 288 | 290 | 292 |
|---|---|---|---|---|---|
| 282 | Manufacturer | Model | LED Location | LED Color | State |
| 282 | Manufacturer | Model | LED Location | LED Color | State |
| 282 | Manufacturer | Model | LED Location | LED Color | State |
| 282 | Manufacturer | Model | LED Location | LED Color | State |

Figure 2D

Device State Table
300

| | 304 | 306 | 308a | 308b | |
|---|---|---|---|---|---|
| 302 | Manufacturer | Model | State | State | ... |
| 302 | Manufacturer | Model | State | State | ... |
| 302 | Manufacturer | Model | State | State | ... |
| 302 | Manufacturer | Model | State | State | ... |
| 302 | Manufacturer | Model | State | State | ... |
| 302 | Manufacturer | Model | State | State | ... |

Figure 3

METHODS AND SYSTEMS FOR ACQUIRING SPECIFICATIONS FOR REMOTELY CONTROLLING ELECTRONICS

RELATED APPLICATIONS

This application is a continuation of U.S. application Ser. No. 12/940,842, filed Nov. 5, 2010, entitled "Methods and Systems for Acquiring Specifications for Remotely Controlling Electronics," which is incorporated herein by referenced in its entirety.

This application is related to U.S. application Ser. No. 12/940,857, filed Nov. 5, 2010, entitled "Methods and Systems for Remotely Controlling Electronics," which is incorporated by reference herein in its entirety.

TECHNICAL FIELD

The disclosed embodiments relate generally to remotely controlling electronic devices, and more particularly, to remotely controlling electronic devices based on images of the electronic devices.

BACKGROUND

Providing a user-friendly way to remotely control electronic devices, such as home electronics, presents significant engineering challenges. For example, a home electronics center may contain multiple devices, each with its own remote control. While a universal remote control may replace the various remote controls, configuring the universal remote to communicate with each of the multiple devices is challenging and potentially awkward, and thus frustrating to the user.

Furthermore, a user may become confused as to what state a particular device is in and, as a result, use a remote control to issue an instruction to the particular device that does not match the user's wishes. For example, pressing a power button on a remote control typically results in transmission of a "toggle power" signal that turns a device off if it is on and on if it is off. If the user is confused as to whether the device is on or off, pressing the power button will result in turning the device on or off when the user wanted the opposite result.

Accordingly, there is a need for a remote control system that can automatically identify devices to be controlled and track the states of the devices to be controlled.

SUMMARY

Disclosed embodiments allow a remote control to be easily configured to control various devices and to control the devices based on analysis of images of the devices. Information regarding the states of the devices, as determined from the images, can be compared to user commands.

In some embodiments, a computer-implemented method of controlling electronics is performed at an apparatus that includes one or more processors, a camera, and a transmitter. In the method, the camera acquires a first image of one or more electronic devices configured for remote control. A database is queried for information regarding the one or more electronic devices, based on the first image. In response to querying the database, the information regarding the one or more electronic devices is received. This information includes specifications for communicating with the one or more electronic devices. User input is received corresponding to a command for a respective electronic device of the one or more electronic devices. In response to the user input, an instruction corresponding to the command is transmitted to the respective electronic device via a signal generated by the transmitter in accordance with the specifications for communicating with the respective electronic device.

In some embodiments, a system for controlling electronics includes a camera, a transmitter, one or more processors, and memory storing one or more programs configured for execution by the one or more processors. The one or more programs include instructions for using the camera to acquire a first image of one or more electronic devices configured for remote control; instructions for querying a database for information regarding the one or more electronic devices, based on the first image; and instructions for receiving the information regarding the one or more electronic devices in response to querying the database. The information regarding the one or more electronic devices includes specifications for communicating with the one or more electronic devices. The one or more programs also includes instructions for receiving user input corresponding to a command for a respective electronic device of the one or more electronic devices; and instructions for transmitting, in response to the user input, an instruction corresponding to the command to the respective electronic device via a signal generated by the transmitter in accordance with the specifications for communicating with the respective electronic device.

In some embodiments, a non-transitory computer readable storage medium stores one or more programs configured to be executed by a system that includes one or more processors, a camera, and a transmitter. The one or more programs include instructions for using the camera to acquire a first image of one or more electronic devices configured for remote control; instructions for querying a database for information regarding the one or more electronic devices, based on the first image; and instructions for receiving the information regarding the one or more electronic devices in response to querying the database. The information regarding the one or more electronic devices includes specifications for communicating with the one or more electronic devices. The one or more programs also include instructions for receiving user input corresponding to a command for a respective electronic device of the one or more electronic devices; and instructions for transmitting, in response to the user input, an instruction corresponding to the command to the respective electronic device via a signal generated by the transmitter in accordance with the specifications for communicating with the respective electronic device.

In some embodiments, a computer-implemented method of controlling electronics is performed at an apparatus that includes one or more processors, a camera, and a transmitter. The camera is situated within line-of-sight of a plurality of electronic devices, configured for remote control, that includes a switch and a set of devices coupled to the switch. The switch includes a plurality of input ports and an output port. Respective devices of the set are coupled to respective input and output ports of the switch. The switch further includes a plurality of lights (e.g., LEDs) associated with respective ports of the input and output ports. In the method, the camera acquires a first image of the switch. An instruction is transmitted to a respective device of the set. After transmitting the instruction to the respective device, the camera acquires a second image of the switch. The first and second images are compared to identify a light that changed state between the first and second images. Based on this comparison, a determination is made that the respective device is coupled to the respective port associated with the light that changed state. A first user input is received corresponding to a command to select the respective device. In response to the first user input, an instruction is transmitted to the switch to connect the port to which the respective device was determined to be coupled to another port.

In some embodiments, a system for controlling electronics includes a transmitter, a camera, one or more processors, and memory storing one or more programs configured for execution by the one or more processors. The camera is situated within line-of-sight of a plurality of electronic devices, configured for remote control, that includes a switch and a set of devices coupled to the switch. The switch includes a plurality of input ports and an output port. The respective devices of the set are coupled to respective input and output ports of the switch. The switch further includes a plurality of lights (e.g., LEDs) associated with respective ports of the input and output ports. The one or more programs include instructions for using the camera to acquire a first image of the switch; instructions for transmitting an instruction to a respective device of the set; instructions for acquiring a second image of the switch, after transmitting the instruction to the respective device; instructions for comparing the first and second images to identify a light that changed state between the first and second images; and instructions for determining that the respective device is coupled to the respective port associated with the light that changed state, based on the comparison between the first and second images. The one or more programs also include instructions for receiving a first user input corresponding to a command to select the respective device; and instructions for transmitting, in response to the first user input, an instruction to the switch to connect the port to which the respective device was determined to be coupled to another port.

In some embodiments, a non-transitory computer readable storage medium stores one or more programs configured to be executed by a system that includes a transmitter, a camera, and one or more processors. The camera is situated within line-of-sight of a plurality of electronic devices, configured for remote control, that includes a switch and a set of devices coupled to the switch. The switch includes a plurality of input ports and an output port. Respective devices of the set are coupled to respective input and output ports of the switch. The switch further includes a plurality of lights (e.g., LEDs) associated with respective ports of the input and output ports. The one or more programs include instructions for using the camera to acquire a first image of the switch; instructions for transmitting an instruction to a respective device of the set; instructions for acquiring a second image of the switch, after transmitting the instruction to the respective device; instructions for comparing the first and second images to identify a light that changed state between the first and second images; and instructions for determining that the respective device is coupled to the respective port associated with the light that changed state, based on the comparison between the first and second images. The one or more programs also include instructions for receiving a first user input corresponding to a command to select the respective device; and instructions for transmitting, in response to the first user input, an instruction to the switch to connect the port to which the respective device was determined to be coupled to another port.

BRIEF DESCRIPTION OF THE DRAWINGS

FIG. 2A illustrates a data structure for a table storing physical specifications of electrical devices, in accordance with some embodiments.

FIG. 2B illustrates a data structure for a table storing device images, in accordance with some embodiments.

FIG. 2C illustrates a data structure for a table storing signal specifications for remote control instructions, in accordance with some embodiments.

FIG. 2D illustrates a data structure for a table storing specifications for device states as indicated by LEDs on respective devices, in accordance with some embodiments.

FIG. 3 illustrates a data structure for a table storing states of electronic devices in accordance with some embodiments.

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the present inventions. However, it will be apparent to one of ordinary skill in the art that the present inventions may be practiced without these specific details. In other instances, well-known methods, procedures, components, and circuits have not been described in detail so as not to unnecessarily obscure aspects of the embodiments.

Figure 1A:
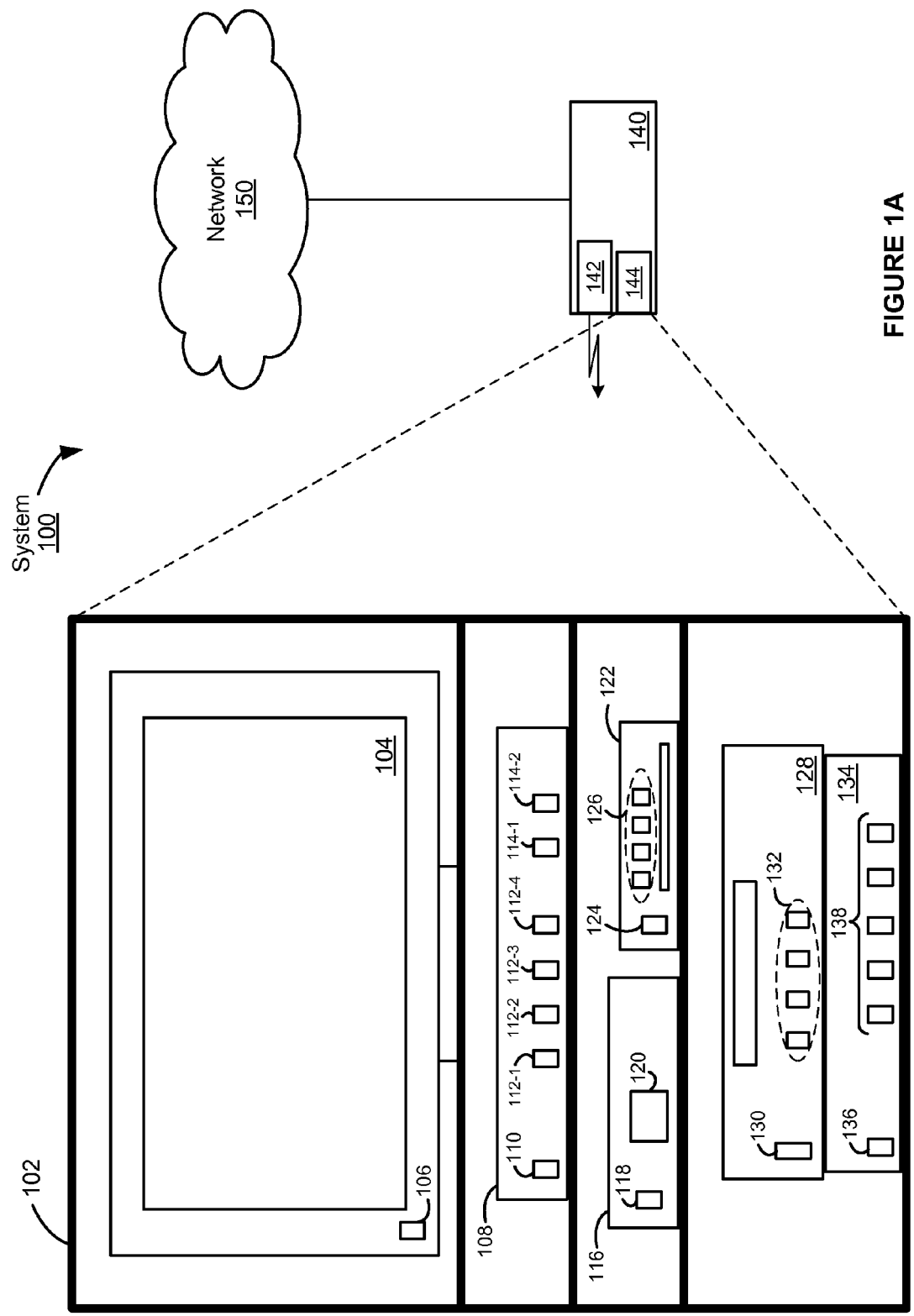
FIG. 1A illustrates a system that includes a home electronics center and an apparatus configured to remotely control electronic devices in the home electronics center, in accordance with some embodiments.

FIG. 1A illustrates a system 100 that includes a home electronics center 102 and an apparatus 140 configured to remotely control electronic devices in the home electronics center 102, in accordance with some embodiments. The home electronics center 102 includes multiple electronic devices, each of which can be remotely controlled; these devices include a television 104, a switch (e.g., a High-Definition Multimedia Interface, or HDMI, switch) 108, a set-top box (STB) 116 (e.g., a cable box or satellite dish controller), a digital videodisc (DVD) player (e.g., a standard DVD player or a Blu-Ray player) or video game console 122, a videocassette recorder (VCR) 128, and a home theater PC (HTPC) 134. These devices are merely examples of devices that may be remotely controlled by the apparatus 140. Other examples are possible (e.g., other types of media players besides the DVD player 122 and VCR 128).

The devices in the home electronics center 102 include lights (e.g., light-emitting diodes (LEDs)) for indicating various states of respective devices. For example, the television 104 includes a power LED 106, the switch 108 includes a power LED 110; the STB 116 includes a power LED 118, the DVD player 122 includes a power LED 124, the VCR 128 includes a power LED 130, and the HTPC 134 includes a power LED 136. Each of the power LEDs 106, 110, 118, 124, 130, and 136 indicates whether the power for the corresponding device is on or off. The switch 108 also includes LEDs 112-1 through 112-4, each of which is associated with a respective input port, and LEDs 114-1 through 114-2, each of which is associated with a respective output port. The STB 116 also includes an LED display 120 to indicate a channel to which the STB 116 is tuned. The DVD player 122 also includes a plurality of LEDs 126 to indicate a performance state of the DVD player 122 (e.g., to indicate whether the DVD player 122 is playing a DVD, is paused, is stopped, etc.). Similarly, the VCR 128 also includes a plurality of LEDs 132 to indicate a performance state of the VCR 128 and the HTPC 134 also includes a plurality of LEDs 138 to indicate a performance state of the HTPC 134. These LEDs are merely examples of lights that may be found on electronic devices and that indicate the states of the electronic devices; other examples are possible.

In some embodiments, an LED or other light can emit multiple colors, depending on an underlying state of the corresponding device. For example, each of the LEDs 112-1 through 112-4 on the switch 108 emits a first color (e.g., red) if the input port corresponding to the LED 112 is coupled to an active device (and thus, for example, is receiving an input signal) but is not connected to an output port, and emits a second color (e.g., blue) if the input port is coupled to an active device and also is connected to an output port. If the input port is not coupled to an active device, the corresponding LED 112 is off.

Various devices 104, 108, 116, 122, 128, and/or 134 can be connected to each other in various possible configurations. These connections cannot be determined, however, by viewing the front of the home electronics center 102. For example, these connections are made using cables at the rear of the home electronics center 102. In some embodiments, various devices are selectively coupled via the switch 108. For example, the STB 116, DVD player 122, VCR 128, and HTPC 134 are coupled to respective input ports of the switch 108, and the television 104 is coupled to an output port (or both output ports) of the switch 108. The STB 116, DVD player 122, VCR 128, and HTPC 134 thus each can be selectively coupled to the television 104 via the switch 108. Which devices are connected to which ports of the switch 108 cannot be determined, however, by viewing the front of the home electronics center 102.

An apparatus 140 is configured to function as a remote control and includes a transmitter 142 and a camera 144. The apparatus 140 is situated such that the electronic devices 104, 108, 116, 122, 128, and 134 in the home electronics center 102 are within view of the camera 144: a picture taken with the camera 144, or in other words an image acquired using the camera 144, thus will include the devices 104, 108, 116, 122, 128, and 134. The transmitter 142 transmits instructions to respective devices 104, 108, 116, 122, 128, and/or 134, thereby remotely controlling the devices. In some embodiments, the transmitter 142 is an infrared (IR) transmitter that transmits IR signals that convey respective instructions. Alternatively, the transmitter 142 is a radio frequency (RF) transmitter that transmits RF signals that convey respective instructions. In some embodiments, the apparatus 140 includes both an IR transmitter and an RF transmitter, for situations in which some devices in the home electronics center 102 are remotely controlled using IR signals and other devices in the home electronics center 102 are remotely controlled using RF signals.

In some embodiments, the apparatus 140 is a cellular phone, personal digital assistant, or similar hand-held computing device. In some embodiments, the apparatus 140 is a tablet computer or laptop computer. In some embodiments, the apparatus 140 is a dedicated remote control device. Alternatively, the apparatus 140 includes a computing device, an external transmitter, and an external camera; the computing device is coupled to the external transmitter and the external camera via a wired or wireless connection. In still other embodiments, the transmitter is internal to the computing device but the camera is external, or the camera is internal to the computing device but the transmitter is external. An example 800 of the apparatus 140 is described in more detail below with respect to FIG. 8.

Figure 1B:
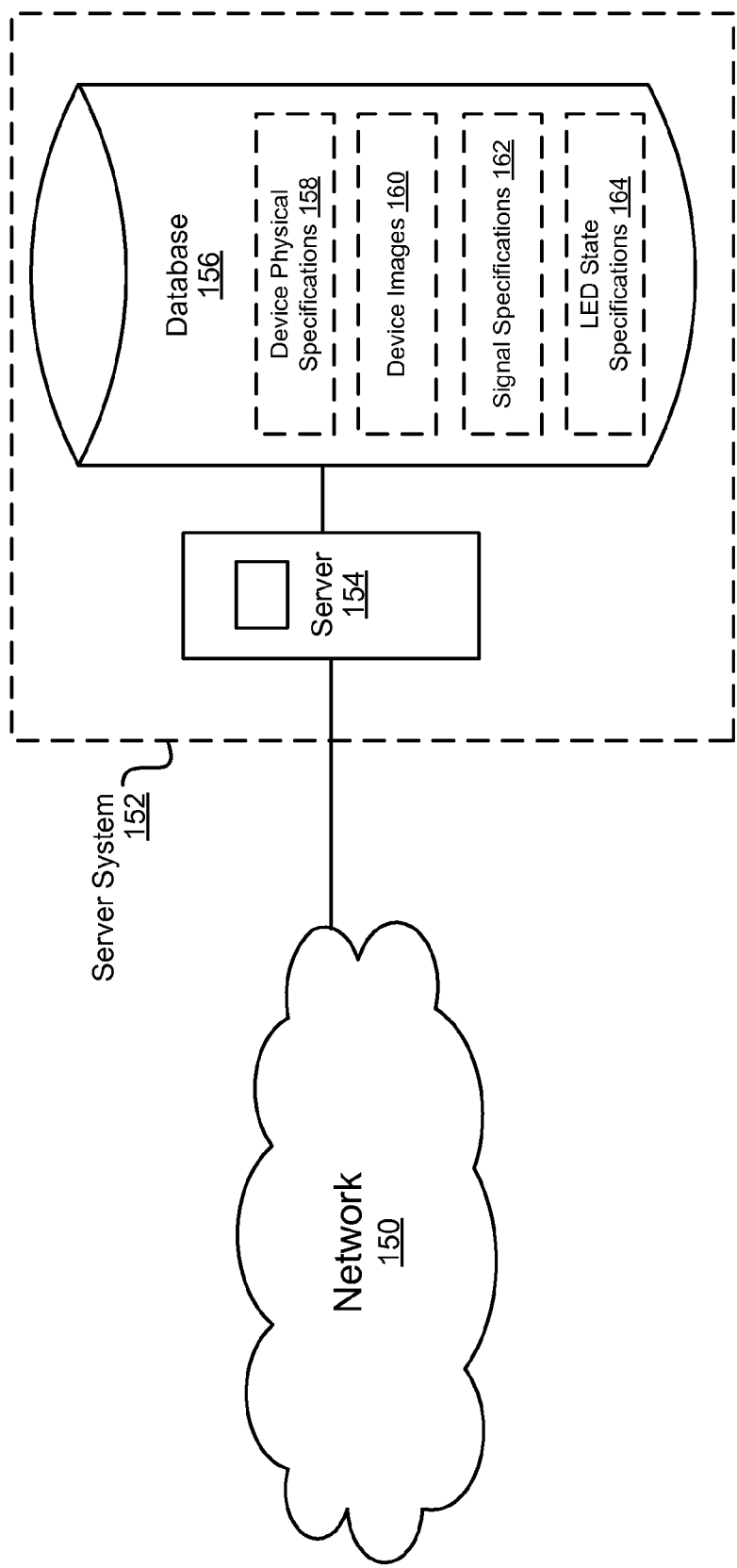
FIG. 1B is a block diagram illustrating a server system connected to a network in accordance with some embodiments.

The apparatus 140 is connected (e.g., via a wireless connection) to a network 150. The network 150 is any suitable wired and/or wireless network and may include, for example, a local area network (LAN), wide area network (WAN), virtual private network (VPN), the Internet, a metropolitan area network (MAN), or any combination of these or similar networks. As illustrated in FIG. 1B in accordance with some embodiments, the network 150 is also connected to a server system 152 and thus couples the apparatus 140 to the server system 152.

The server system 152 includes a server 154 and a database 156. The server 154 serves as a front-end for the server system 152 and provides an interface between the server system 152 and the apparatus 140. The apparatus 140 thus is a client device of the server system 152. In some embodiments, the functions of the server 154 are divided or allocated among two or more servers. It should be appreciated that the server system 152, including the server 154 and the database 156, may be implemented as a distributed system of multiple computers and storage devices. However, for convenience of explanation, the server system 152 is described herein as being implemented on a single computer (e.g., a server system 700, FIG. 7), which can be considered a single logical system.

The database 156 stores information to help the apparatus 140 identify, control, and track the states of devices in the home electronics center 102. For example, the database 156 includes device physical specifications 158 (e.g., as stored in a table 200, FIG. 2A), device images 160 (e.g., as stored in a table 230, FIG. 2B), signal specifications 162 for device instructions (e.g., as stored in a table 260, FIG. 2C), and specifications 164 for device states as indicated by LEDs (or other lights) on respective devices (e.g., as stored in a table 280, FIG. 2D).

Before beginning to use the apparatus 140 to remotely control the devices 104, 108, 116, 122, 128, and 134 in the home electronics center 102, the apparatus 140 is situated such that the devices are in view of the camera 144. The camera 144 acquires an image of the devices and transmits a query to the server system 152 for information regarding the devices. In some embodiments, the camera 144 transmits the image to the server system 152 as part of the query. The server system 152 uses the device physical specifications 158 or the device images 160 in the database 156 to identify the devices in the image.

For example, in some embodiments the server system 152 identifies the devices in the image by comparing physical specifications of the devices as determined from the image to physical specifications stored in a Device Physical Specifications Table 200 (FIG. 2A) in the database 156. The table 200 includes a row 202 for each device in the database 156. A column 204 stores manufacturer names and a column 206 stores model names and/or numbers. A column 208 stores physical dimensions (e.g., width and height) of devices. A column 210 stores images of logos, if any, on the front of devices, and a corresponding column 212 specifies the locations of the logos on the fronts of the devices. A column 214 specifies a location of respective first LEDs (or other lights) on the fronts of the devices, and a corresponding column 216 specifies one or more colors of the first LEDs. Additional columns may specify the locations and colors of additional LEDs (or other lights) on the fronts of the devices. If the dimensions (e.g., relative dimensions, such as the ratio of the width to the height, as adjusted to account for the angle of the image), lights, and logo (if any) of a device as determined from the image match (e.g., to within a specified degree of tolerance) the dimensions, lights, and logo specified in a row 202, then the device is assumed to have the manufacturer and model name or number specified in the row 202, and is identified accordingly. In some embodiments, once one device in the image has been identified, absolute dimensions of other devices in the image are determined by appropriate scaling and compared to dimensions in the column 208. In some embodiments, if a light as shown in the image is not on, the corresponding column for the color of the light (e.g., column 216) is ignored. However, if a light emits a different color than the color(s) specified in the corresponding column for the color of the light (e.g., column 216), then the row 202 in question is determined not to match the device.

In some embodiments, the manufacturer and/or model appear on the front of the device and thus can be determined from the image. If the model appears on the front of the device, the device is identified accordingly and no search of the other columns of the table 200 is performed. If the manufacturer but not the model appears on the front of the device, the search of the table 200 is limited to rows that match the manufacturer.

In another example, the server system 152 identifies the devices in the image by comparing the image received from the apparatus 140 to device images stored in a Device Image Table 230 (FIG. 2B) in the database 156, using object recognition and computer vision algorithms. For example, the devices may be identified using an application such as Google Goggles. The table 230 includes a row 232 for each device in the database 156. A column 234 stores manufacturer names and a column 236 stores model names and/or numbers. A column 238 stores an image of each device in the database 156. The server system 152 compares the images in the column 238 to the image received from the apparatus 140. If the image in a row 232 matches a device as shown in the image received from the apparatus 140, then the device is assumed to have the manufacturer and model name or number specified in the row 232, and is identified accordingly. In some embodiments, the algorithm used to compare the received image to the device images in the table 230 accounts for expected variation in lighting, perspective, and distance between the camera and devices and considers a device in the received image to match a respective device image in the table 230 if they match to with a specified, predefined tolerance. If a device in the received image matches more than one device images in the table 230 to within the specified tolerance, the server system 152 may transmit the manufacturer and model of each device to the apparatus 140 and prompt the user (e.g., via the display 810, FIG. 8) to select the proper device (e.g., via the selection device 811, FIG. 8). In some embodiments, the server system 152 also transmits to the apparatus 140 the device images in the table 230, which can be displayed by the apparatus 140 (e.g., on the display 810, FIG. 8) to assist the user's selection of the proper device.

In some embodiments, if no match is found using either the Device Physical Specifications Table 200 (FIG. 2A) or the Image Table 230 (FIG. 2B), the server system 152 transmits a message to the apparatus 140 to prompt the user to re-acquire an image using the apparatus 140 under improved condition (e.g., with improved lighting and/or a more direct angle with respect to the home electronics center 102). If the server system 152 still is not able to identify the devices using the re-acquired image, the server system 152 may prompt the user to enter manufacturer and model information manually.

In some embodiments, instead of sending the image to the server system 152, the apparatus 140 analyzes the image (e.g., using classical object recognition techniques, such as edge detection), extracts physical specifications of respective devices from the image, and transmits the extracted physical specifications to the server system 152. In some embodiments, the extracted physical specifications include relative physical dimensions (e.g., ratios of widths to heights). Alternatively, the object recognition techniques determine absolute physical dimensions, based, for example, on identification of other objects of known size that appear in the image. The server system 152 then compares the extracted physical specifications to physical specifications listed in the table 200, to identify the devices in the image.

Once the devices in the image have been identified, remote control signal specifications for instructions to be issued to the identified devices are retrieved from an instruction signal specifications table 260 in the database 156, as illustrated in FIG. 2C in accordance with some embodiments. The table 260 includes a row 262 for each device in the database 156. A column 264 stores manufacturer names and a column 266 stores model names and/or numbers. A column 268 stores remote-control instructions for respective devices, and a corresponding column 270 stores specifications for the signals corresponding to respective instructions. The server system 152 retrieves these specifications for each of the identified devices and transmits the retrieved specifications to the apparatus 140. For example, the server system 152 generates a table that includes only those rows 262 of the table 260 that correspond to the identified devices, and transmits the generated table to the apparatus 140 in response to the query. The apparatus 140 uses the specifications received from the server system 152 to transmit instructions to the devices 104, 108, 116, 122, 128, and/or 134 and thus to remotely control the devices.

In some embodiments, the specifications include test instructions, which the apparatus 140 issues to respective devices to verify that the devices have been properly identified and that the proper specifications have been provided. For example, the apparatus 140 verifies that the test instructions have functioned properly by issuing respective instructions, acquiring new images of the devices, and analyzing the images to determine whether the instructions were performed. This analysis is described further below. Alternatively, the user is prompted to test whether the proper specifications were provided and to provide a confirmation.

In some embodiments, the database 156 also stores specifications 164 for device states as indicated by LEDs (or other lights) on respective devices. These specifications 164 are stored in a table 280, as illustrated in FIG. 2D in accordance with some embodiments. The table 280 includes one or more rows 282 for each device in the database 156; if a device has multiple LEDs, the table 280 includes a row 282 for each LED. A column 284 stores manufacturer names and a column 286 stores model names and/or numbers. A column 288 stores LED locations, a corresponding column 290 stores colors of the LEDs whose locations are specified in the column 288, and a column 292 stores device states indicated by the LEDs when emitting the colors specified in the column 290. For example, a row 282 for a power LED 106, 110, 118, 124, 130, or 136 includes an entry in the column 292 that specifies that the device specified by the row's entries in columns 284 and 286 is powered on when the LED emits the color specified in the row's entry in the column 290. In another example, a row 282 for an LED (e.g., one of the LEDs 126 or 132, FIG. 1A) associated with a "play" button on a DVD player 122 or VCR 128 includes an entry in the column 292 that specifies that the device is playing a DVD or videotape when the LED emits the color specified in the row's entry in the column 290. In yet another example, a row 282 for an LED (e.g., one the LEDs 112-1 through 112-4) associated with an input port of the switch 108 includes an entry in the column 292 that indicates whether the port is connected to an output port, based on a color specified in the row's entry in the column 290.

The server system 152 retrieves the specifications in the table 280 for each of the identified devices and transmits the retrieved specifications to the apparatus 140. For example, the server system 152 generates a table that includes only those rows 282 of the table 280 that correspond to the identified devices, and transmits the generated table to the apparatus 140 in response to the query. The apparatus 140 uses the LED state specifications received from the server system 152 to track the states of the devices 104, 108, 116, 122, 128, and/or 134 and to process user commands accordingly. To use the LED state specifications to track device states, the apparatus 140 transforms the LED locations received from the server system 152, which are specified with respect to corresponding devices (e.g., with a corner of a device considered to be the origin), to expected LED locations in the image. Alternatively, this transformation is performed at the server system 152.

In some embodiments, the apparatus 140 generates a device state table 300 that stores the current states of the devices 104, 108, 116, 122, 128, and/or 134, as shown in FIG. 3. For example, the apparatus 140 compares the lights in an image acquired by the camera 144 to the LED state specifications received from the server system 152 to generate the table 300. The table 300 includes a row 302 for each device identified in the image. Columns 304 and 306 store manufacturer names and model names or numbers, and thus identify the devices. One or more columns 308 identify states of the devices. For example, a first column 308a indicates whether respective devices are on or off and a second column 308b indicates an operation or function that a respective device is currently performing.

When the apparatus 140 receives a user command for a respective device 104, 108, 116, 122, 128, or 134 to perform a function, the apparatus 140 compares the command to the state table 300 before issuing an instruction corresponding to the command, to ensure that the instruction matches the user's intentions as indicated by the command. In some embodiments, after receiving the command but before comparing the command to the state table 300, the apparatus 140 acquires a new image using the camera 144 and updates the state table 300 accordingly. For example, if the apparatus 140 receives a command to turn on a particular device, the camera 144 acquires an image of the device and updates an entry in the table 300 to indicate the current power state of the device (e.g., is the device on or off?) as determined from the image. If the device is determined to be off, the apparatus 140 transmits a "toggle power" command to the device, thus turning the device on. If, however, the device is determined to be on, the apparatus 140 suppresses transmission of the "toggle power" command, thus leaving the device on, in accordance with the command.

Figure 4A:
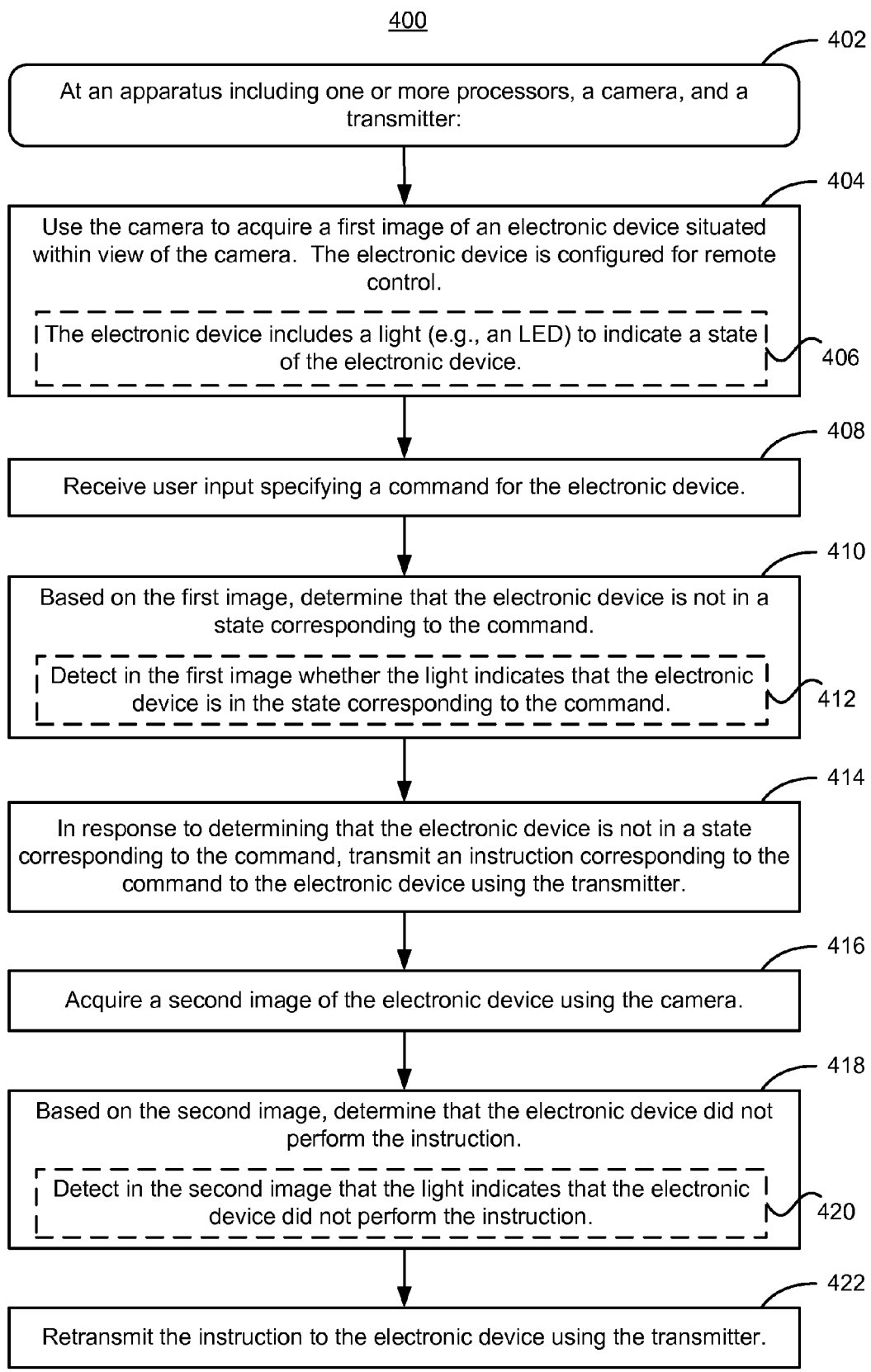
FIGS. 4A and 4B are flow diagrams illustrating methods of remotely controlling electronic devices in accordance with some embodiments.

Attention is now directed to methods of remotely controlling electronics (e.g., home electronics). FIG. 4A is a flow diagram illustrating a method 400 of remotely controlling electronic devices in accordance with some embodiments.

Figure 8:
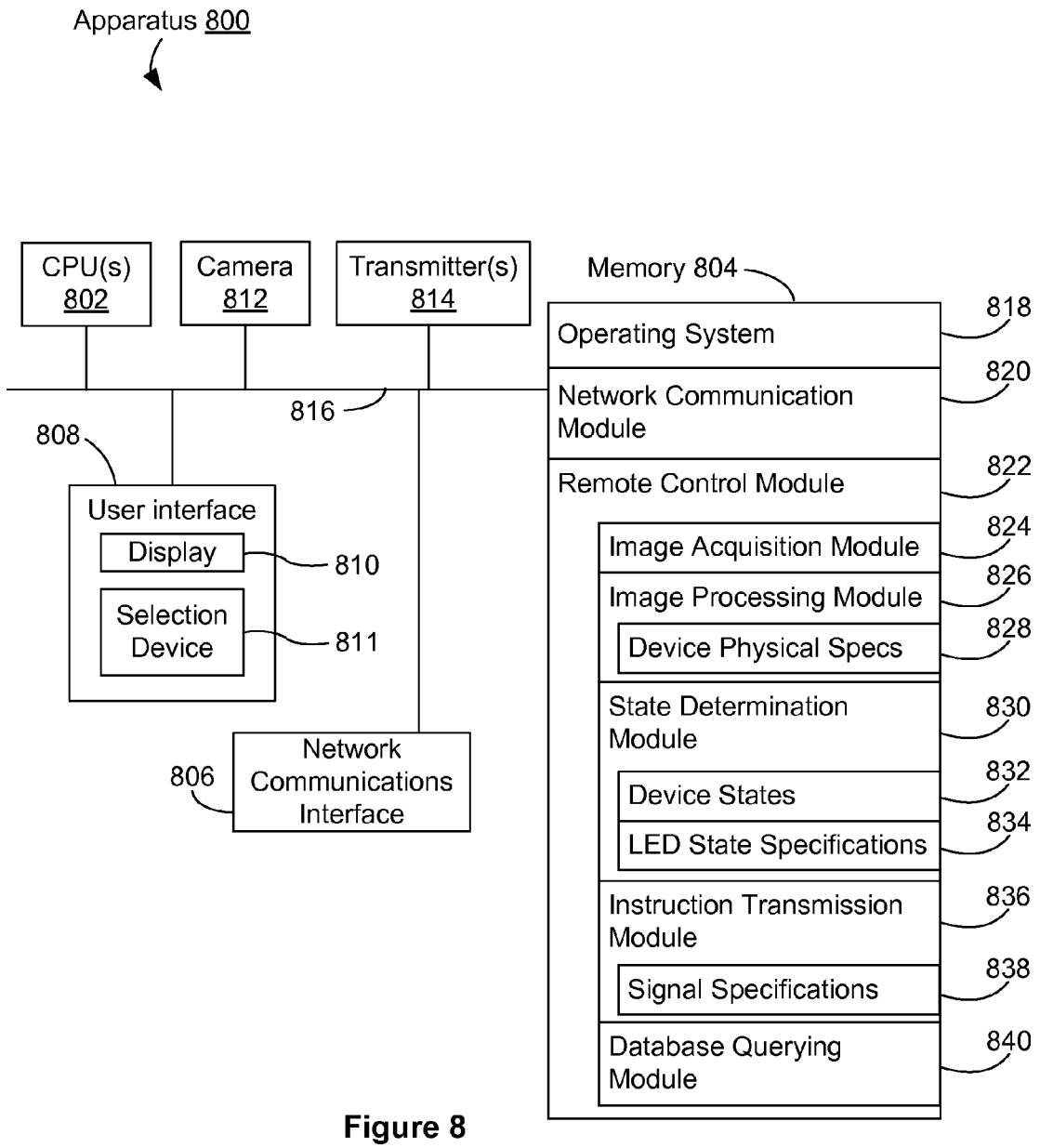
FIG. 8 is a block diagram illustrating an apparatus configured to remotely control electronic devices in accordance with some embodiments.

The method 400 is performed (402) at an apparatus (e.g., 140, FIG. 1A; 800, FIG. 8) that includes one or more processors (e.g., CPU(s) 802, FIG. 8), a camera (e.g., 144, FIG. 1A; 812, FIG. 8), and a transmitter (e.g., 142, FIG. 1A; 814, FIG. 8).

In the method 400, the camera acquires (404) a first image of an electronic device (e.g., one of the devices 104, 108, 116, 122, 128, and 134, FIG. 1A) situated within view of the camera and configured for remote control. For example, the image may include all of the devices 104, 108, 116, 122, 128, and 134 in the home electronics center 102 or may focus in on one or more of the devices.

The apparatus receives (408) user input specifying a command for the electronic device. Based on the first image, the apparatus determines (410) that the electronic device is not in a state corresponding to the command. For example, the apparatus updates the state table 300 (FIG. 3) based on the first image and queries the table 300 to determine whether the electronic device is in the state corresponding to the command.

In some embodiments, the electronic device includes (406) a light (e.g., an LED) to indicate a state of the electronic device, and the operation 410 includes detecting (412) in the first image whether the light indicates that the electronic device is in the state corresponding to the command. For example, the apparatus compares the light as shown in the first image to LED state specification information 834 (FIG. 8) received from the server system 152, where the information is stored in the table 280 (FIG. 2D).

In response to determining that the electronic device is not in a state corresponding to the command, the apparatus transmits (414) an instruction corresponding to the command to the electronic device using the transmitter. The instruction is transmitted, for example, via an IR or RF signal generated in accordance with signal specifications 838 (FIG. 8) received from the server system 152, where the signal specifications are stored in the table 260 (FIG. 2C).

For example, consider when the command is a command to turn the electronic device on. The apparatus detects (412) that the power LED for the electronic device (e.g., a power LED 106, 110, 118, 124, 130, or 136) indicates that the device is off, thereby determining that the electronic device is not already on and thus is not already in a state corresponding to the command. The apparatus then transmits (414) a "toggle power" instruction to the electronic device, which turns the device on. In the converse example, the command is a command to turn the electronic device off. The apparatus detects (412) that the power LED for the electronic device indicates that the device is on, thereby determining that the electronic device is not already off and thus is not already in a state corresponding to the command. The apparatus then transmits (414) a "toggle power" instruction to the electronic device, which turns the device off. The apparatus thus can receive and process separate "power on" and "power off" commands, as opposed to the single "toggle power" instruction provided by a traditional remote control.

In yet another example, the electronic device is a switch (e.g., the switch 108, FIG. 1A) and the command is a command to connect one of the switch's input ports to an output port. The apparatus detects (412) that the LED associated with the input port (e.g., one of the LEDs 112-1 through 112-4) indicates that the input port is not already connected to the output port. For example, the LED is determined to be emitting a color that indicates that the input port is not already connected to the output port. The apparatus then transmits (414) an instruction to the switch to connect the input port to the output port.

In some embodiments, the electronic device is a television (e.g., television 104, FIG. 1) and the determination in the operation 410 is made based on how the television screen appears in the first image. For example, consider when the command is a command to turn the television on (or off): the apparatus determines (410) that the screen is dark (or is emitting light), which indicates that the television is not already on (or is already on) and thus is not already in a state corresponding to the command. The apparatus then transmits (414) a "toggle power" instruction to the television, which turns the device on (or off).

In some embodiments, the camera acquires (416) a second image of the electronic device. Based on the second image, the apparatus determines (418) that the electronic device did not perform the instruction. (Alternatively, the apparatus determines that the electronic device performed the instruction, in which case the method 400 ends.) In some embodiments, determining (418) that the electronic device did not perform the instruction includes detecting (420) in the second image that the light indicates that the electronic device did not perform the instruction. In response to determining (418) that the electronic device did not perform the instruction, the apparatus retransmits (422) the instruction to the electronic device using the transmitter.

The method 400 thus ensures that the instruction transmitted to the electronic device corresponds to the user's wishes as indicated by the command. Also, the operations 416-422 ensure that a desired instruction is retransmitted if it is not initially performed, which can occur, for example, if the apparatus is temporarily blocked when transmitting the original instruction. While the method 400 includes a number of operations that appear to occur in a specific order, it should be apparent that the method 400 can include more or fewer operations (e.g., the method 400 could end after operation 414 or 416). An order of two or more operations may be changed (e.g., operation 404 may be performed after operation 408). Two or more operations may be combined into a single operation.

Figure 4B:
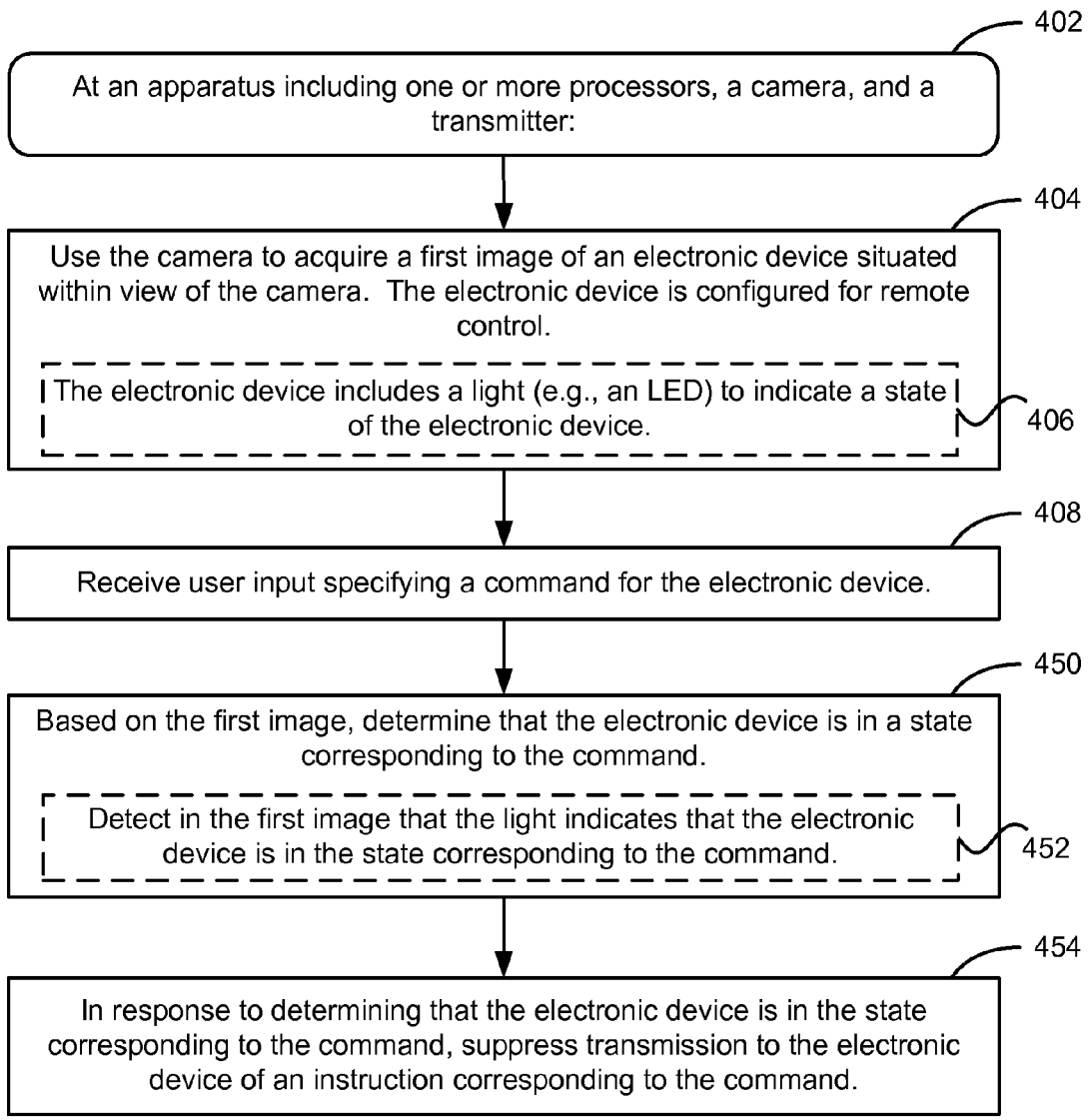

FIG. 4B is a flow diagram illustrating a method 440 of remotely controlling electronic devices in accordance with some embodiments. The method 440 is performed (402) at an apparatus (e.g., 140, FIG. 1A; 800, FIG. 8) that includes one or more processors (e.g., CPU(s) 802, FIG. 8), a camera (e.g., 144, FIG. 1A; 812, FIG. 8), and a transmitter (e.g., 142, FIG. 1A; 814, FIG. 8).

In the method 440, the operations 404-408 are performed as described above for the method 400 (FIG. 4A). Based on the first image as acquired in the operation 404, the apparatus determines (450) that the electronic device is in a state corresponding to the command. In some embodiments, to make this determination, the apparatus detects (452) in the first image that the light indicates that the electronic device is in the state corresponding to the command. The operations 450 and 452 are performed as described for the operations 410 and 412 (FIG. 4A), respectively, except that opposite conclusions are reached.

In response to determining that the electronic device is in the state corresponding to the command, the apparatus suppresses transmission (454) to the electronic device of an instruction corresponding to the command. For example, if the command is a command to turn the electronic device on (or off), and the apparatus determines that the electronic device is already on (or off), then the apparatus suppresses transmission of a "toggle power" command.

The method 440 thus ensures that instructions that do not reflect a user's wishes as indicated by the command are not transmitted. While the method 440 includes a number of operations that appear to occur in a specific order, it should be apparent that the method 400 can include more or fewer operations. An order of two or more operations may be changed, and two or more operations may be combined into a single operation.

Figure 5A:
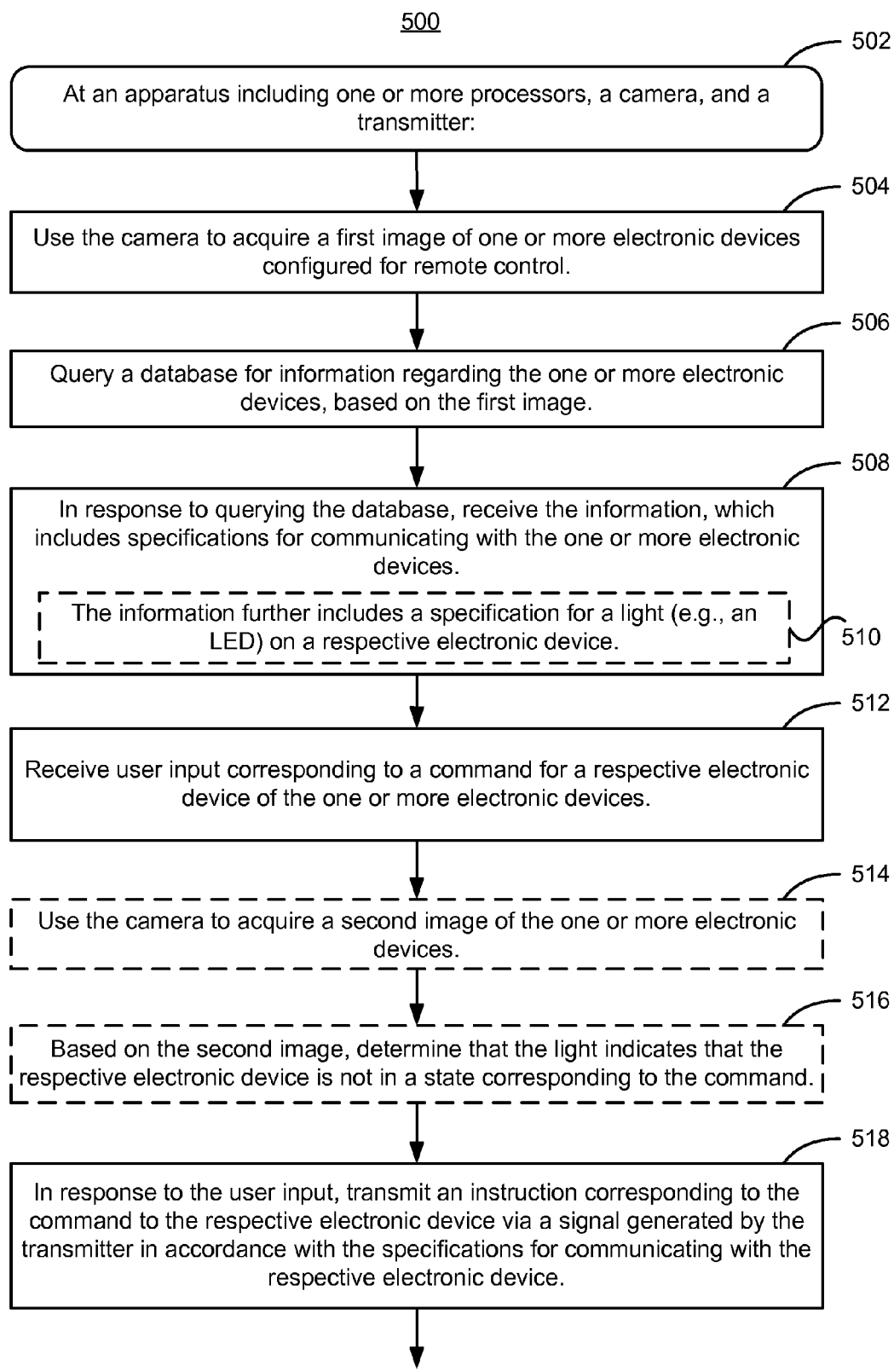
FIGS. 5A and 5B are flow diagrams illustrating methods of remotely controlling electronic devices in accordance with some embodiments.

FIG. 5A is a flow diagram illustrating a method 500 of remotely controlling electronic devices in accordance with some embodiments. The method 500 is performed (502) at an apparatus (e.g., 140, FIG. 1A; 800, FIG. 8) that includes one or more processors (e.g., CPU(s) 802, FIG. 8), a camera (e.g., 144, FIG. 1A; 812, FIG. 8), and a transmitter (e.g., 142, FIG. 1A; 814, FIG. 8). The method 500 allows the apparatus to be configured to remotely control devices by visually identifying the devices in a picture and providing specifications for communicating with the identified devices to the apparatus.

In the method 500, the camera acquires (504) a first image of one or more electronic devices configured for remote control (e.g., of one or more of the devices 104, 108, 116, 122, 128, and 134, FIG. 1A).

The apparatus queries (506) a database (e.g., the database 156 in the server system 152, FIG. 1B) for information regarding the one or more electronic devices, based on the first image. For example, the apparatus transmits the first image to the server system 152 as part of the query. The server system 152 then compares the first image to images stored in the table 230 (FIG. 2B) to identify the one or more electronic devices shown in the first image. Alternatively, image processing software (e.g., in the specification comparison module 724, FIG. 7) in the server system 152 analyzes the image, extracts physical specifications (e.g., dimensions, locations of LEDs, and markings such as logos and part numbers) of the one or more electronic devices in the first image, and compares the physical specifications to physical specification stored in the table 200 (FIG. 2A), to identify the one or more electronic devices. In another alternative, image processing software (e.g., an image processing module 826, FIG. 8) in the apparatus analyzes the first image, extracts the physical specifications of the one or more electronic devices in the first image, and transmits the physical specifications to the server system 152 to be compared against physical specifications stored in the table 200 (FIG. 2A).

In some embodiments, image processing software in the apparatus identifies the one or more electronic devices in the first image and transmits a list of the identified device(s) to the server system 152 as part of the query.

In response to querying the database, the apparatus receives (508) the information regarding the one or more electronic devices, which includes specifications for communicating with the one or more electronic devices. For example, the apparatus receives signal specifications extracted from the table 260 (FIG. 2C) and stores them as signal specifications 838 (FIG. 8). In some embodiments, at least one (e.g., all) of the one or more electronic devices are configured for remote control via IR signals, and the information includes IR signal specifications for instruction signals to be transmitted from the apparatus to the device(s). In some embodiments, at least one (e.g., all) of the one or more electronic devices are configured for remote control via RF signals, and the information includes RF signal specifications for instruction signals to be transmitted from the apparatus to the device(s).

In some embodiments, the information includes signal specifications for instructions to toggle the power of the one or more electronic devices. In some embodiments, the information includes signal specifications for instructing respective devices to perform various operations. In some embodiments, a respective device is a switch (e.g., the switch 108, FIG. 1), and the information includes a signal specification for an instruction to connect an input port to an output port.

In some embodiments, the information further includes (510) a specification for a light (e.g., an LED) on a respective electronic device. For example, the apparatus receives LED specifications extracted from the table 200 (FIG. 2A) or 280 (FIG. 2D) and stores them as specifications 834 (FIG. 8); the specifications 834 include a description of the location and/or color of the light. In some embodiments, the information specifies that a first color of the light corresponds to a first state of the respective electronic device and a second color of the light corresponds to a second state of the respective electronic device. For example, each of the LEDs 112-1 through 112-4 on the switch 108 emits a first color (e.g., red) if the input port corresponding to the LED 112 is coupled to an active device (an thus, for example, is receiving an input signal) but is not connected to an output port, and emits a second color (e.g., blue) if the input port is coupled to an active device and also is connected to an output port.

The apparatus receives user input (512) corresponding to a command for a respective electronic device of the one or more electronic devices.

In some embodiments, the camera acquires (514) a second image of the one or more electronic devices. Based on the second image, the apparatus determines (516) that the light indicates that the respective electronic device is not in a state corresponding to the command.

In response to the user input, the apparatus transmits (518) an instruction corresponding to the command to the respective electronic device via a signal generated by the transmitter in accordance with the specifications for communicating with the respective electronic device. (If the apparatus had determined in operation 516 that the respective electronic device was already in a state corresponding to the command, the apparatus would suppress transmission of the instruction in operation 518).

Figure 5B:
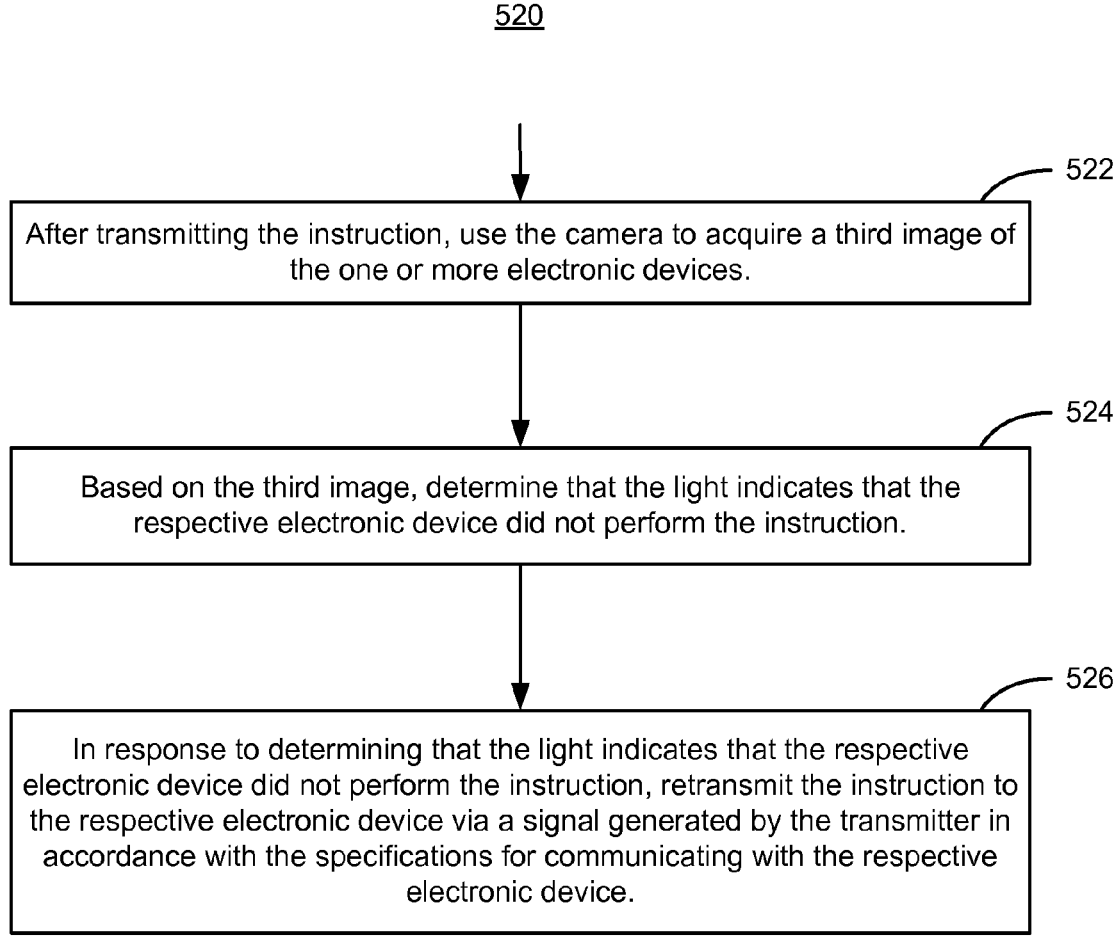

FIG. 5B is a flow diagram illustrating a method 520 that is performed as a continuation of the method 500 in accordance with some embodiments. The method 520 that uses image processing to determine whether the electronic device performed the instruction and thus whether the instruction needs to be retransmitted. Specifically, after the instruction is transmitted in operation 518, the camera acquires (522) a third image of the one or more electronic devices. Based on the third image, the apparatus determines (524) that the light indicates that the respective electronic device did not perform the instruction.

In response to determining that the light indicates that the respective electronic device did not perform the instruction, the apparatus retransmits (526) the instruction to the respective electronic device via a signal generated by the transmitter in accordance with the specifications for communicating with the respective electronic device. (Alternatively, if the apparatus in operation 524 determines that the light indicates that the respective electronic device performed the instruction, retransmission is suppressed.)

The methods 500 and 520 thus identify devices to be controlled by the apparatus and provide the apparatus with signal specifications for controlling the devices. While the methods 500 and 520 include a number of operations that appear to occur in a specific order, it should be apparent that the methods 500 and 520 can include more or fewer operations. For example, the operations 514 and 516 are omitted in embodiments that do not perform visual processing to verify instructions or determine whether to issue instructions. An order of two or more operations may be changed, and two or more operations may be combined into a single operation.

Figure 6:
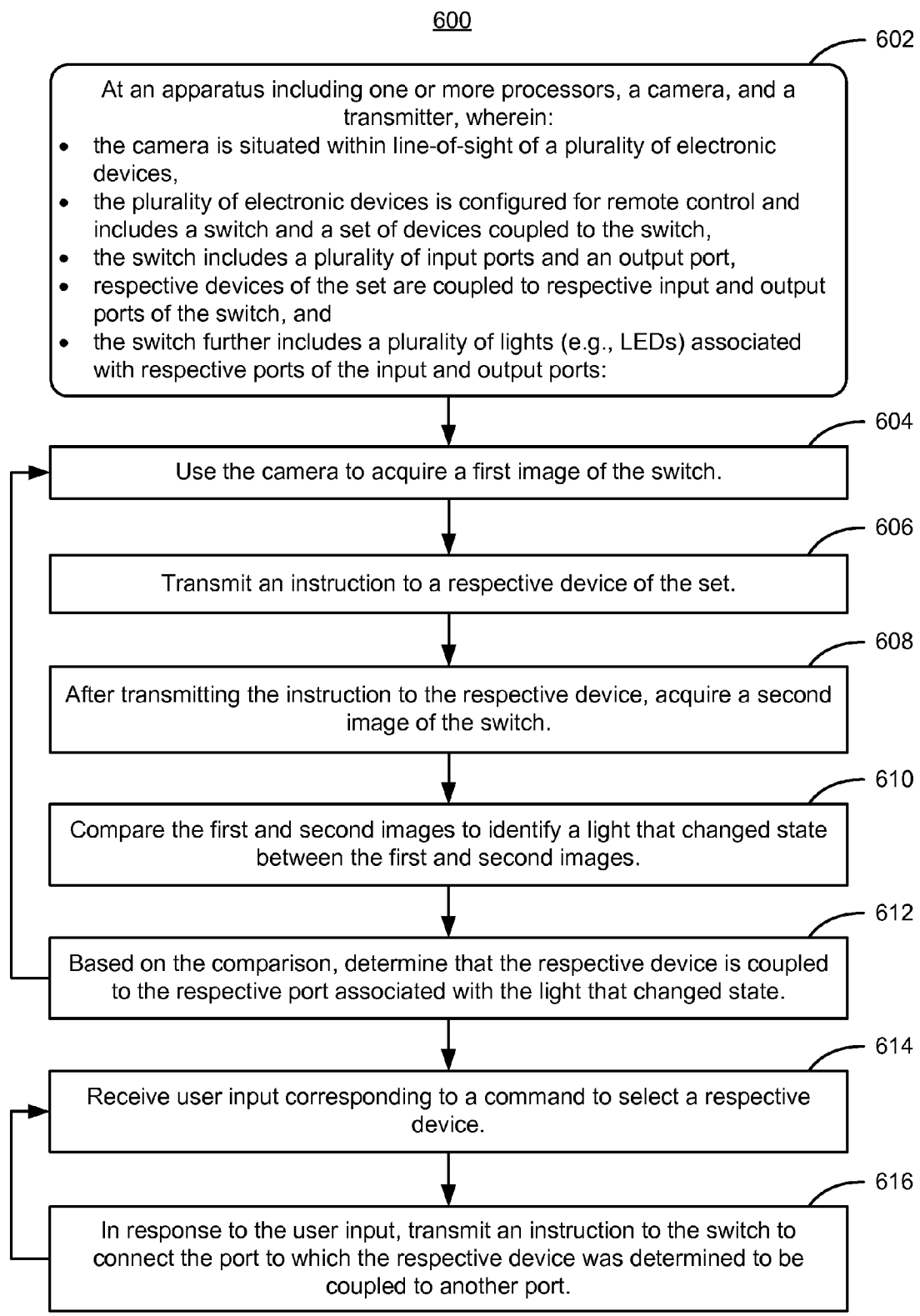
FIG. 6 is a flow diagram illustrating a method of remotely controlling electronic devices in accordance with some embodiments.

FIG. 6 is a flow diagram illustrating a method 600 of remotely controlling electronic devices in accordance with some embodiments. The method 600 automatically determines which devices are coupled to which ports of a switch, and thus allows a user to remotely control a switch without having to trace out and keep track of these connections.

Specifically, the method 600 is performed (602) at an apparatus that includes one or more processors (e.g., CPU(s) 802, FIG. 8), a camera (e.g., 144, FIG. 1A; 812, FIG. 8), and a transmitter (e.g., 142, FIG. 1A; 814, FIG. 8). The camera is situated within line-of-sight of a plurality of electronic devices configured for remote control, including a switch (e.g., the switch 108, FIG. 1A) and a set of devices (e.g., devices 104, 116, 122, 128, and/or 134) coupled to the switch. The switch includes a plurality of input ports and an output port; respective devices of the set are coupled to respective input and output ports of the switch. For example, the devices 116, 122, 128, and 134 are coupled to respective input ports and the television 104 is coupled to an output port (or both output ports) of the switch 108. The switch further includes a plurality of lights (e.g., LEDs 112-1 through 112-4 and 114-1 through 114-2, FIG. 1A) associated with respective ports of the input and output ports.

In the method 600, the camera acquires (604) a first image of the switch. In some embodiments, the first image includes other devices as well as the switch. For example, the first image includes all of the devices in the home electronics center 102.

The apparatus transmits (606) an instruction to a respective device of the set of devices. For example, the apparatus transmits an instruction to toggle the power of the respective device.

After the apparatus transmits the instruction to the respective device, the camera acquires (608) a second image of the switch.

The apparatus compares (610) the first and second images to identify a light on the switch that changed state between the first and second images (e.g., that turned on or off, or that changed color). Based on the comparison, the apparatus determines (612) that the respective device is coupled to the respective port associated with the light that changed state. The apparatus records this determination, for example, in an entry in a row 302 corresponding to the switch in the device state table 300 (FIG. 3).

In some embodiments, the operations 604-612 are repeated, with instructions being transmitted (606) to successive electronic devices in the set of devices, to map out all of the connections between devices and ports. The user is thus spared having to trace cable connections to determine which device is coupled to which port.

The apparatus receives (614) a user input corresponding to a command to select a respective device. In response to the user input, the apparatus transmits (616) an instruction to the switch to connect the port to which the respective device was determined to be coupled to another port. For example, the respective device was determined to be coupled to one of the input ports, and the instruction is an instruction to connect an output port to the input port to which the respective device was determined to be coupled.

In some embodiments, the operations 614 and 616 are repeated for multiple user inputs corresponding to commands to select (or deselect) various respective electronic devices of the set.

The method 600 thus allows a user to remotely control a switch without having to trace out and keep track of the connections between the switch and various devices. While the method 600 includes a number of operations that appear to occur in a specific order, it should be apparent that the method 600 can include more or fewer operations and that two or more operations may be combined into a single operation.

Figure 7:
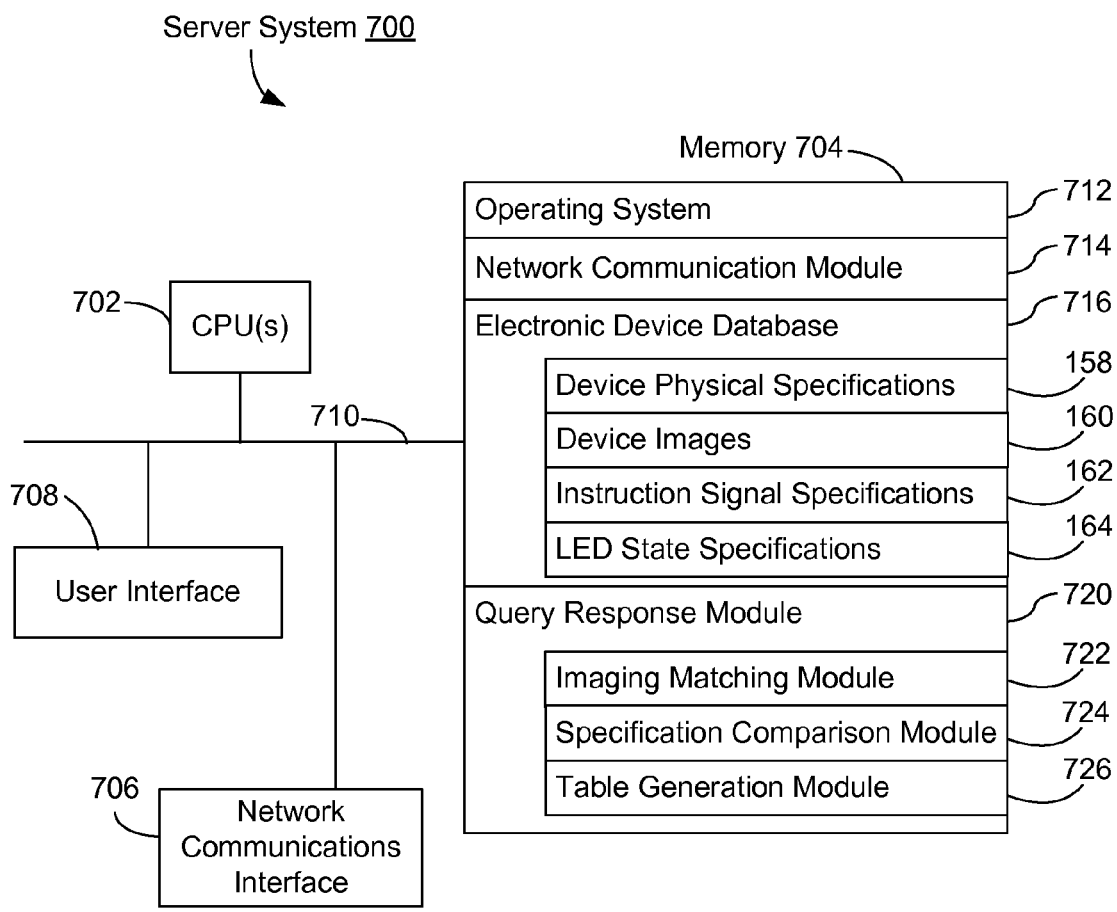
FIG. 7 is a block diagram illustrating a server system in accordance with some embodiments.

FIG. 7 is a block diagram illustrating a server system 700 in accordance with some embodiments. The server system 700, which is an implementation of the server system 152 (FIG. 1), typically includes one or more processors (e.g., CPUs) 702, one or more network or other communications interfaces 706, memory 704, and one or more communication buses 710 for interconnecting these components. The communication buses 710 may include circuitry (sometimes called a chipset) that interconnects and controls communications between system components. The server system 700 optionally may include user interface hardware 708, which may include a display device (not shown), and a keyboard and/or a mouse (not shown). Memory 704 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 704 may optionally include one or more storage devices remotely located from the CPU(s) 702. Memory 704, or alternately non-volatile memory device(s) within memory 704, comprises a non-transitory computer readable storage medium. In some embodiments, memory 704 stores the following programs, modules and data structures, or a subset thereof:

- an operating system 712 that includes procedures for handling various basic system services and for performing hardware dependent tasks;
- a network communication module 714 that is used for connecting the server system 700 to other computers (e.g., to apparatuses 140, FIG. 1A) via the one or more network communication interfaces 706 and one or more communication networks (e.g., the network 150, FIGS. 1A-1B), such as the Internet, other wide area networks, local area networks, metropolitan area networks, and so on;
- an electronic device database 716 (e.g., the database 156, FIG. 1B), which includes device physical specifications 158 (e.g., as stored in the table 200, FIG. 2A), device images 160 (e.g., as stored in the table 230, FIG. 2B), instruction signal specifications (e.g., as stored in the table 260, FIG. 2C), and/or LED state specifications (e.g., as stored in the table 280, FIG. 2D); and
- a query response module 720 for responding to queries from remote control apparatuses 140 (FIG. 1A).

In some embodiments, the query response module 720 includes an image matching module 722 to compare images received in queries to images 160 of electronic devices stored in the table 230 (FIG. 2B), to identify electronic devices shown in the images received in the queries. This comparison is performed using known image-matching algorithms. In some embodiments, the query response module 720 includes a specification comparison module 724 to compare physical specifications of electronic devices (e.g., as specified in queries or as determined from images received in queries) to the physical specifications 158 stored in the table 200 (FIG. 2A), to identify the electronic devices. In some embodiments, the query response module 720 includes a table generation module 726 to generate tables containing information to be transmitted to apparatuses 140 in response to queries. For example, the table generation module 726 retrieves the requested information from the tables 260 (FIG. 2C) and/or 280 (FIG. 2D), packages the information into tables, and transmits the tables to the apparatuses 140 in response to queries.

Each of the above identified elements in FIG. 7 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 704 may store a subset of the modules and data structures identified above. Furthermore, memory 704 may store additional modules and data structures not described above.

Although FIG. 7 shows a "server system," FIG. 7 is intended more as a functional description of the various features which may be present in a set of servers than as a structural schematic of the embodiments described herein. In practice, items shown separately could be combined and some items could be separated. For example, some items shown separately in FIG. 7 could be implemented on single servers and single items could be implemented by one or more servers.

FIG. 8 is a block diagram illustrating an apparatus 800 configured to remotely control electronic devices (e.g., one or more of the devices 104, 108, 116, 122, 128, and 134, FIG. 1A) in accordance with some embodiments. The apparatus 800, which is an implementation of an apparatus 140 (FIG. 1A), typically includes one or more processors (e.g., CPUs) 802, one or more network or other communications interfaces 806, memory 804, and one or more communication buses 816 for interconnecting these components. The communication buses 816 may include circuitry (sometimes called a chipset) that interconnects and controls communications between system components. The apparatus 800 also includes a camera 812 and one or more transmitters 814 (e.g., an IR transmitter and/or an RF transmitter). The camera 812 and transmitter 814 are implementations of the camera 144 and transmitter 142 (FIG. 1A). In some embodiments, the camera 812 and/or transmitter 814 are included in a unitary housing that encases the other components of the apparatus 800 as well; in other embodiments, the camera 812 and/or transmitter 814 are physically separate from the other components of the apparatus 800 and are electrically coupled to the other components via a wired or wireless connection. The apparatus 800 may also include user interface hardware 808 including a display device 810 and a keyboard and/or a selection device (e.g., a touch pad, touch screen, or mouse) 811. Memory 804 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 804 may optionally include one or more storage devices remotely located from the CPU(s) 802. Memory 804, or alternately non-volatile memory device(s) within memory 804, comprises a non-transitory computer readable storage medium. In some embodiments, memory 804 stores the following programs, modules, and data structures, or a subset thereof:

- an operating system 818 that includes procedures for handling various basic system services and for performing hardware dependent tasks;
- a network communication module 820 that is used for connecting the apparatus 800 to other computers (e.g., the server system 152, FIG. 1B) via the one or more network communication interfaces 806 and one or more communication networks (e.g., the network 150, FIGS. 1A-1B), such as the Internet, other wide area networks, local area networks, metropolitan area networks, and so on; and a remote control module 822 to remotely control one or more electronic devices (e.g., the devices 104, 108, 116, 122, 128, and/or 134, FIG. 1A).

The remote control module 822 includes an image acquisition module 824 to acquire images using the camera 812, an image processing module 826 to process images acquired by the image acquisition module 824, a state determination module 830 to determine and track the states of the electronic devices to be remotely controlled, an instruction transmission module 836 to generate and transmit instruction to the electronic devices in response to user inputs, and a database query module to query a database (e.g., the database 156, FIG. 1B) for information regarding the electronic devices to be remotely controlled. The image processing module 826 stores device physical specifications 828 (e.g., as received from the server system 152, FIG. 1B, where they are stored in the table 200, FIG. 2A). The state determination module 830 stores device states 832 (e.g., in a table 300, FIG. 3) and LED state specifications 834 (e.g., as received from the server system 152, FIG. 1B, where they are stored in the table 280, FIG. 2D). The instruction transmission module 836 includes signal specifications 838 (e.g., as received from the server system 152, FIG. 1B, where they are stored in the table 260, FIG. 2C).

In some embodiments, the remote control module 822 includes instructions for performing all or a portion of the operations of the methods 400 (FIG. 4A), 440 (FIG. 4B), 500 (FIG. 5A), 520 (FIG. 5B), and 600 (FIG. 6).

Each of the above identified elements in FIG. 8 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 804 may store a subset of the modules and data structures identified above. Furthermore, memory 804 may store additional modules and data structures not described above.

The foregoing description, for purpose of explanation, has been described with reference to specific embodiments. However, the illustrative discussions above are not intended to be exhaustive or to limit the inventions to the precise forms disclosed. Many modifications and variations are possible in view of the above teachings. The embodiments were chosen and described in order to best explain the principles of the inventions and their practical applications, to thereby enable others skilled in the art to best utilize the inventions and various embodiments with various modifications as are suited to the particular use contemplated.

What is claimed is:

1. A computer-implemented method of controlling electronics, comprising:
   at an apparatus comprising one or more processors and a transmitter:
      acquiring a first image of one or more electronic devices configured for remote control;
      querying a database for information regarding the one or more electronic devices, based on the first image; and
      in response to the querying, receiving the information, which comprises a specification for a light on a respective electronic device of the one or more electronic devices.

2. The computer-implemented method of claim 1, wherein:
   the transmitter is an infra-red (IR) transmitter;
   the one or more electronic devices are configured for remote control via IR signals; and
   the information includes a speciation for communicating with the one or more electronic devices via the IR signals.

3. The computer-implemented method of claim 1, wherein:
   the transmitter is a radio frequency (RF) transmitter;
   the one or more electronic devices are configured for remote control via RF signals; and
   the information includes a specification for communicating with the one or more electronic devices via the RF signals.

4. The computer-implemented method of claim 1, wherein the specification for the light comprises a description of the location of the light on the respective electronic device.

5. The computer-implemented method of claim 1, wherein the specification for the light comprises an indication of a color of the light.

6. The computer-implemented method of claim 1, wherein the specification for the light specifies that a first color of the light corresponds to a first state of the respective electronic device and a second color of the light corresponds to a second state of the respective electronic device.

7. The computer-implemented method of claim 1, further comprising:
   transmitting an instruction to the respective electronic device via a signal generated by the transmitter;
   after transmitting the instruction, using a camera to acquire a second image of the one or more electronic devices;
   based on the second image, determining that the light indicates that the respective electronic device did not perform the instruction; and
   in response to the determining, retransmitting the instruction to the respective electronic device via a signal generated by the transmitter.

8. The computer-implemented method of claim 1, further comprising:
   receiving user input corresponding to a command for a respective electronic device of the one or more electronic devices;
   using a camera to acquire a second image of the one or more electronic devices; and
   based on the second image, determining that the light indicates that the respective electronic device is not in a state corresponding to the command;
   wherein the instruction is transmitted in response to the user input and also in response to the determining.

9. The computer-implemented method of claim 1, wherein the specification further comprises a specification for an instruction for toggling the power of the respective electronic device.

10. The computer-implemented method of claim 1, wherein:
   the respective electronic device is a switch comprising a plurality of input ports and an output port; and
   the specification further comprises a specification for an instruction to connect a respective input port of the plurality of input ports to the output port.

11. The computer-implemented method of claim 1, wherein querying the database comprises providing the first image to the database.

12. The computer-implemented method of claim 11, wherein:
  the database is situated in a server system distinct from the computing device; and
  providing the first image to the database comprises transmitting the first image from the computing device to the server system.

13. The computer-implemented method of claim 1, further comprising identifying the one or more electronic devices in the first image, wherein querying the database comprises providing a listing of the one or more electronic devices to the database.

14. A system for controlling electronics, comprising:
  a transmitter;
  one or more processors; and
  memory storing one or more programs configured for execution by the one or more processors, the one or more programs comprising:
    instructions for acquiring a first image of one or more electronic devices configured for remote control;
    instructions for querying a database for information regarding the one or more electronic devices, based on the first image; and
    instructions for receiving the information in response to the querying, the information comprising a specification for a light on a respective electronic device of the one or more electronic devices.

15. The system of claim 14, wherein the specification for the light comprises a description of the location of the light on the respective electronic device.

16. The system of claim 14, wherein the specification for the light comprises an indication of a color of the light.

17. The system of claim 14, wherein the specification for the light specifies that a first color of the light corresponds to a first state of the respective electronic device and a second color of the light corresponds to a second state of the respective electronic device.

18. A non-transitory computer readable storage medium storing one or more programs configured to be executed by a system comprising one or more processors and a transmitter, the one or more programs comprising:
  instructions for acquiring a first image of one or more electronic devices configured for remote control;
  instructions for querying a database for information regarding the one or more electronic devices, based on the first image; and
  instructions for receiving the information in response to the querying, the information comprising a specification for a light on a respective electronic device of the one or more electronic devices.

19. The non-transitory computer readable storage medium of claim 18, wherein the specification for the light comprises a description of the location of the light on the respective electronic device.

20. The non-transitory computer readable storage medium of claim 18, wherein the specification for the light comprises an indication of a color of the light.

21. The non-transitory computer readable storage medium of claim 18, wherein the specification for the light specifies that a first color of the light corresponds to a first state of the respective electronic device and a second color of the light corresponds to a second state of the respective electronic device.

* * * * *